United States Patent

[11] 3,629,713

| [72] | Inventor | Stanislaw Szpilka<br>plac Grunwaldzki 4/84, Katowice, Poland |
|------|----------|---------------------------------------------------------------|
| [21] | Appl. No. | 42,256 |
| [22] | Filed | June 1, 1970 |
| [45] | Patented | Dec. 21, 1971 |
| [32] | Priority | Oct. 13, 1966 |
| [33] | | Poland |
| [31] | | P. 116867<br>Continuation-in-part of application Ser. No. 672,238, Oct. 2, 1967, now abandoned. This application June 1, 1970, Ser. No. 42,256 |

[54] METHOD OF OBTAINING THE SIGNAL DEPENDENT UPON THE PERCENTAGE ASYMMETRY OF A 3-PHASE SYSTEM
4 Claims, 5 Drawing Figs.

[52] U.S. Cl. ................................................ 328/149,
328/110, 328/147, 317/27, 307/273, 307/232
[51] Int. Cl. ........................................................ H03b 3/04,
H03k 5/20

[50] Field of Search............................................ 307/232,
273; 328/109, 147, 149, 110; 330/30 D; 317/27

[56] References Cited
UNITED STATES PATENTS

| 2,784,257 | 3/1957 | Earp.............................. | 328/110 X |
| 3,001,100 | 9/1961 | Schuh et al. ................... | 317/27 X |
| 3,522,455 | 8/1970 | Thomas et al. ................ | 307/273 X |
| 3,536,957 | 10/1970 | Iverson et al. ................. | 317/27 |
| 3,543,239 | 11/1970 | Wallace........................... | 328/109 X |

*Primary Examiner*—John S. Heyman
*Attorney*—Waters, Roditi, Schwartz & Nissen

ABSTRACT: For a three-phase input signal, three detecting circuits for generating triggering pulses when the phases reach predetermined magnitudes and monostable circuits generating rectangular pulses under the control of the triggering pulses, there further being a gate to generate an output signal when the three-phase signal is unbalanced.

METHOD OF OBTAINING THE SIGNAL DEPENDENT UPON THE PERCENTAGE ASYMMETRY OF A 3-PHASE SYSTEM

BACKGROUND

This application is a continuation-in-part of application Ser. No. 672,238, filed Oct. 2, 1967, now abandoned.

1. Field of Invention

This invention relates to nonlinear filters and more particularly to balance pulse filters of a type which is responsive to discrete values of three input signals which are components of a three-phase AC system and which is able on the basis of these detected discrete values to produce an output signal dependent upon the phase angle errors of the three-phase system and providing a method of direct determination of an imbalance factor for a three-phase voltage or current system.

2. Prior Art

Heretofore, the imbalance factor of three-phase AC systems has been determined by means of linear filters, namely sequence segregating filters having an output proportional to positive or negative phase sequence. This leads to an indirect measurement of imbalance factor requiring a calculation of the ratio of negative to positive phase sequences.

SUMMARY OF THE INVENTION

Contrary to the known technique described above, the filter of the invention is adapted to produce an output signal quantitatively related to the imbalance factor of the three-phase system.

One principal object of the invention is to provide an improved sensing device responsive to the asymmetry of three-phase currents or voltages which can be used for measuring and protective techniques for three-phase power systems.

A more specific object of the invention is to provide an improved filter suitable for sensitive protective systems quickly responsive to current or voltage asymmetry in a three-phase power system, such protective systems being stable under starting condition and switching transients. Protective systems using the improved filter of the invention can respond to any fault condition associated with current or voltage asymmetry as might occur, for example, in the case of phase-to-phase short circuits, turn-to-turn short circuits, single-phasing, and so forth.

In accordance with the invention, there is provided a technique which consists of detecting discrete values of current or voltage waves of a three-phase system, in generating three regular sequences of rectangular pulses triggered by each phase and in performing a simple logic operation on generated pulses resulting in an output signal which is a measure of phase angle errors of the same sign. The values of the phase angle errors of the same sign measured in this process determine, with some tolerance, the imbalance factor of the three-phase current or voltage system.

In a preferred embodiment designed for a three-phase AC system, the balance pulse filter circuit comprises three detecting devices, one for each phase, three monostable circuits and a gate circuit. Each detecting device is supplied with one phase and imparts triggering pulses at some discrete values of the input wave. The triggering pulses of each detecting device are in turn applied to the monostable circuit which generates rectangular pulses of the same amplitude, the same polarity and the same duration. All three generated sequences of pulses are applied to a gate circuit providing an output signal when the pulses of any two phases coincide or when gaps between them occur. The duration of generated pulses is such that, at balance condition, there is no output signal with any phase sequence. However, when an asymmetry occurs, the particular sequences of pulses change their phases causing coincidences and gaps to occur, whereby an output signal is produced in the form of pulses the duration of which is a measure of phase angle errors of the same sign.

Other features and advantages of the invention will become apparent from the following detailed description considered in connection with the accompanying drawings.

DETAILED DESCRIPTION

Figure 1:
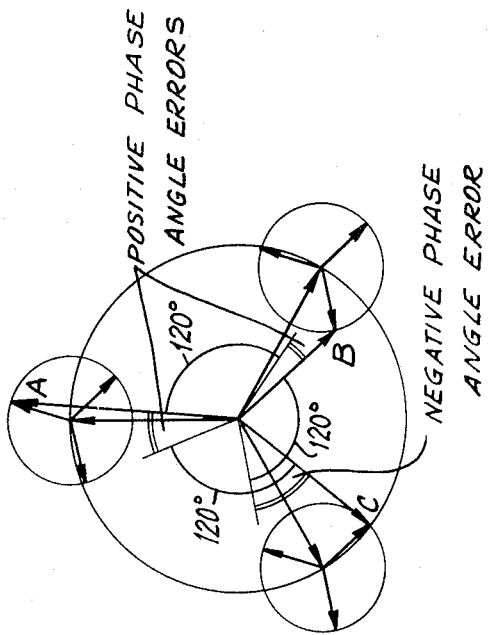
FIG. 1 is a phasor diagram of an unbalanced three-phase system with reference to symmetrical components which shows the relation and designations of the phase angles.
Figure 1:
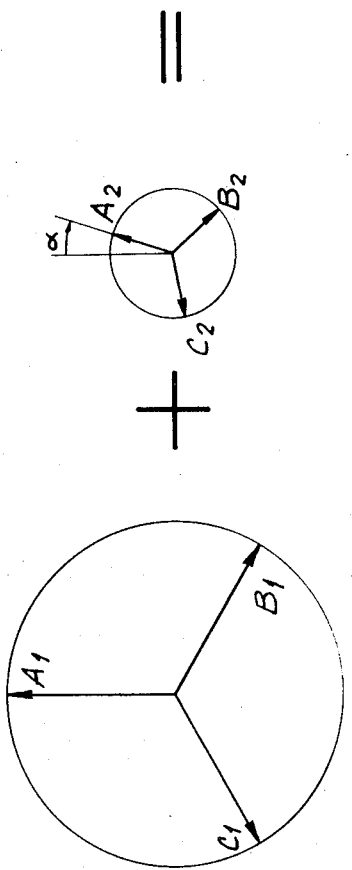

In FIG. 1 are shown phasor diagrams of two symmetrical components, namely, of positive and negative phase sequences and of an unbalanced system composed of these two symmetrical components. The asymmetry of an unbalanced system is characterized by the imbalance factor $\epsilon$ defined by means of symmetrical components as the ratio:

$$\epsilon = A_2/A_1,$$

where $A_2$ is the magnitude of negative phase sequence, and $A_1$ is the magnitude of positive phase sequence.

It is assumed in the above definition that the unbalanced three-phase system considered does not contain a zero sequence component. With this assumption, any asymmetry is associated with the asymmetry in phase shifts of the three-phase system.

An intention of the invention is to make use of this asymmetry in phase shifts in order to obtain information concerning the value of imbalance factor $\epsilon$.

The asymmetry in phase shifts can be characterized by phase angle errors which have been defined as the differences of actual phase angles between proximate phasors and the angle of 120°. The phase angle errors can be positive or negative and the algebraic sum of all three is always equal to zero. However, in accordance with the invention, it is possible to make use of only one sign errors as these carry information about the imbalance factor.

It can be seen from the diagram in FIG. 1, that at a given asymmetry, the phase angle errors depend additionally upon the phase angle $\alpha$ contained between phasors $A_2$ and $A_1$. Consequently, the output signal level, by which the value of one sign errors is meant, depends upon two factors, that is $\epsilon$ and $\alpha$. The angle $\alpha$ depends upon the reason the asymmetry has been developed and should be considered as a random variable. The angle $\alpha$ influences the signal level but, as follows from the phasor diagram, the variation in the signal level at a given asymmetry is limited.

Figure 2:
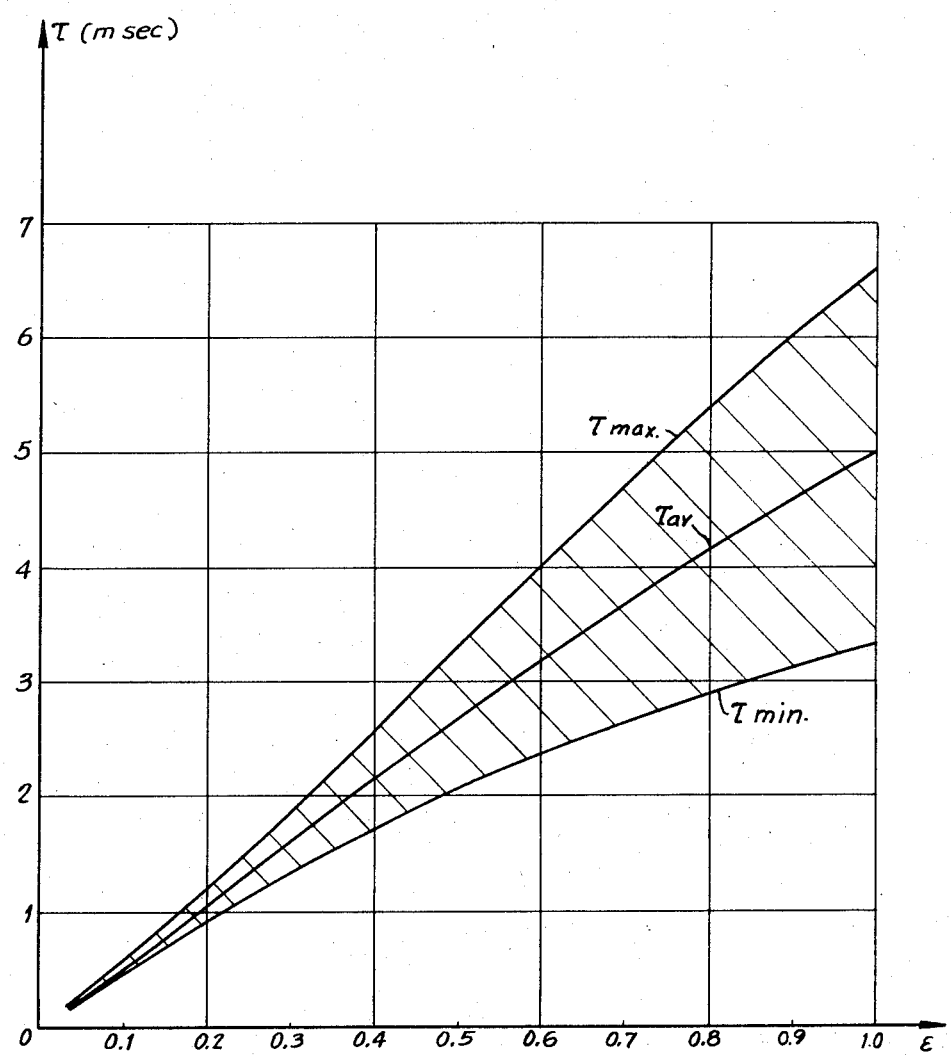
FIG. 2 is a chart of output characteristics pertinent to the balance pulse filter of the invention.

The relation between the imbalance factor and the signal level is shown in FIG. 2. The signal lever is contained between two curves corresponding to the maximum and minimum signal level. These curves have been calculated for a frequency of 50 cps. It follows from the diagram that the variation in the signal level is smaller in proportion to the asymmetry. As, in practice, interest is usually confined to a rather small asymmetry, for example, not greater than $\epsilon = 0.3$, the accuracy in determination of the imbalance factor is satisfactory for various applications, and especially for protective devices.

Figure 3:
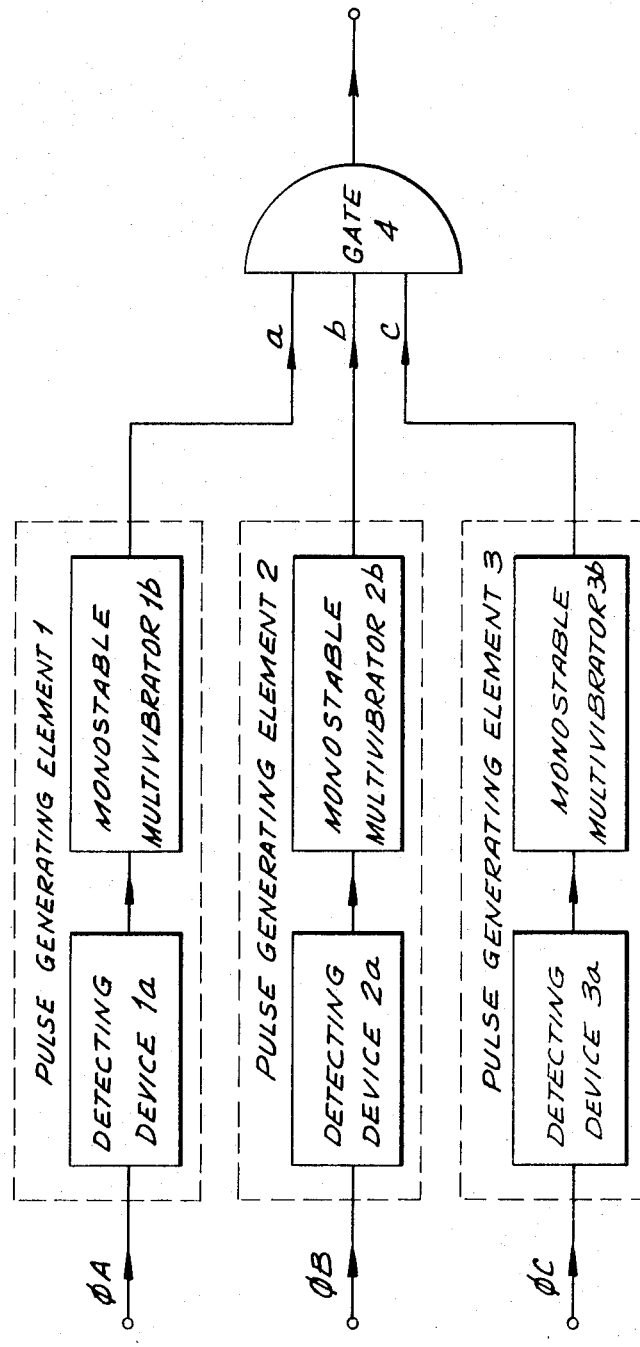
FIG. 3 is a block diagram of a balance pulse filter in accordance with the invention.

The general scheme or organization of the balance pulse filter in a preferred embodiment of the invention appears in block form in FIG. 3. The balance pulse filter illustrated comprises three pulse generating elements 1, 2 and 3 including detecting devices 1a, 2a and 3a, three monostable multivibrators 1b, 2b and 3b, and a gate 4. The three detecting devices receive as inputs three signals $\Phi A$, $\Phi B$ and $\Phi C$ which are proportional to the three-phase currents or three-phase voltages of a three-phase system.

Each detecting device imparts triggering pulses of the same polarity at some chosen discrete values of input signal. The triggering pulses of detecting devices 1a, 2a and 3a are applied to monostable multivibrators 1b, 2b and 3b respectively. The monostable multivibrators generate rectangular pulses of the same amplitude and the same polarity which start at the occurrence of the triggering pulses and end at a time determined by time constant of the multivibrators. The output signal of the multivibrator forms a regular sequence of rectangle pulses which is synchronized with the input signal wave. This is due to the operation of two elements, namely, one detecting device and one monostable multivibrator which can be considered together as a pulse generating element. Thus, it is seen that the balance pulse filter comprises the three phase generating elements 1, 2 and 3, and the gate 4, performing a logic operation resulting in an output signal related to the phase angle errors of the same sign.

Figure 4:
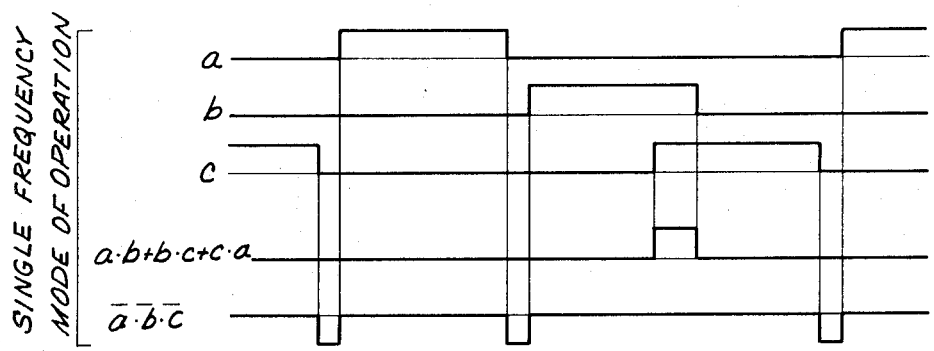
FIG. 4 illustrates waveform relationships for different modes of operation.
Figure 4:
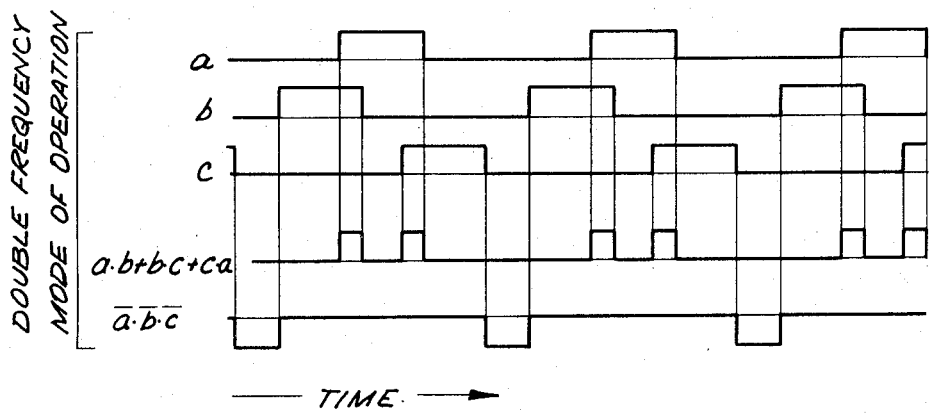

There are possible several modes of operation with this device which will be explained with reference to FIG. 4 in which waveform relationships are illustrated. Input signals are actually sinusoidal but they have been depicted in a schematic way by straight lines in which solid line sections indicate positive halfwaves and dotted line sections indicate negative halfwaves. This is to indicate passages through zero which have been chosen as the discrete values in the preferred embodiment.

The circuits can be arranged such that the detecting devices are responsive only to one discrete value in every cycle, namely, to positive passages through zero, that is to that at which the derivative is positive. Consequently, the monostable multivibrators produce one pulse every cycle providing output signals which are rectangular waves of the same frequency as the frequency of input signal. This mode of operation has been designated as single frequency mode of operation. To this mode of operation a basic pulse-duration equal to one-third $f$, where $f$ is the frequency of the input signal, is assigned. The actual pulse-duration can be equal to the basic pulse-duration or it can be changed in order to achieve some additional features of the filter. In FIG. 4 the waveforms have been drawn under the assumption that the pulse duration is equal to one-third $f$. When the three-phase system is balanced, each pulse is started at the instant at which a pulse of another phase ends, so that neither coincidences nor gaps occur. When the three-phase system is unbalanced, the rectangular waves shift in phase causing coincidences and gaps to occur. The time duration of a coincidence is a measure of positive phase angle error and the time duration of a gap is a measure of negative phase angle error. There are three phase angle errors the sum of which is equal to zero. It follows that in any case of asymmetry either two coincidences and one gap or two gaps and one coincidence have to occur, the overall time-duration within one cycle of coincidences being always equal to overall time-duration of gaps. Thus, for the output signal either coincidences or gaps can be used. Accordingly, the logic operation performed by the gate circuit should be one of the following:

$F_1 = a \cdot b + b \cdot c + c \cdot a$, when coincidences are used, or $F_2 = \overline{a \cdot b \cdot c}$, when gaps are used.

The above formulas express two possible alternatives of producing an output signal. According to the first formula, the durations of output pulses are proportional to positive phase angle errors and, according to the second formula, the durations of output pulses are proportional to negative phase angle errors. In both cases the value of the output signal, by which the overall time-duration of pulses during one cycle is understood, is the same.

Now, the second mode of operation will be considered. In this case, the detecting devices are responsive to every passage through zero of the input signals. Consequently, the monostable multivibrators generate rectangular waves of a frequency twice the frequency of the input signal. This mode of operation is called the double-frequency mode of operation. In this mode of operation, a basic pulse duration equal to one-sixth $f$ is used. The principle of operation in this case is very similar to the previous one and can be easily understood after a study of waveform relationships shown in FIG. 4. In unbalanced condition, coincidences and gaps occur, the duration of which taken separately is a measure of positive or negative phase angle errors. The only difference is that pulses corresponding to phase angle errors appear within a half-cycle. As the output signal, either coincidences or gaps may be used providing two possible alternatives as in the single frequency mode of operation.

Apart from the mode of operation, the value of the output signal is a measure of the sum of phase angle errors of the same sign, which is related to the imbalance factor according to the relationship shown by diagram in FIG. 2.

In all cases in which the actual phase duration is equal to basic pulse duration, the balance pulse filter can be used for continuous monitoring of the asymmetry of a three-phase system. For some applications, however, for example for protective devices, a region of nonoperation is desired. To achieve this, a mode of threshold operation can be easily introduced. This consists in using time-durations for the pulses generated by the multivibrators either shorter or longer than the basic pulse duration, depending whether coincidences or gaps have been used to produce an output signal. If coincidences are used and the multivibrators generate pulses shorter than the basic pulse-duration, preliminary gaps are introduced which appear also under balanced condition. If asymmetry occurs, the output signal will not appear until these gaps have been compensated and this will happen at a definite asymmetry depending upon the width of the gaps. If, for example, in a network of the frequency $f=50$ cps. the gaps are equal to 1 msec. then accordingly to the diagram in FIG. 2 the output signal will not appear until the asymmetry exceeds the value of $\epsilon = 02$. By this, a means of setting a pickup value in a protective device is provided.

Figure 5:
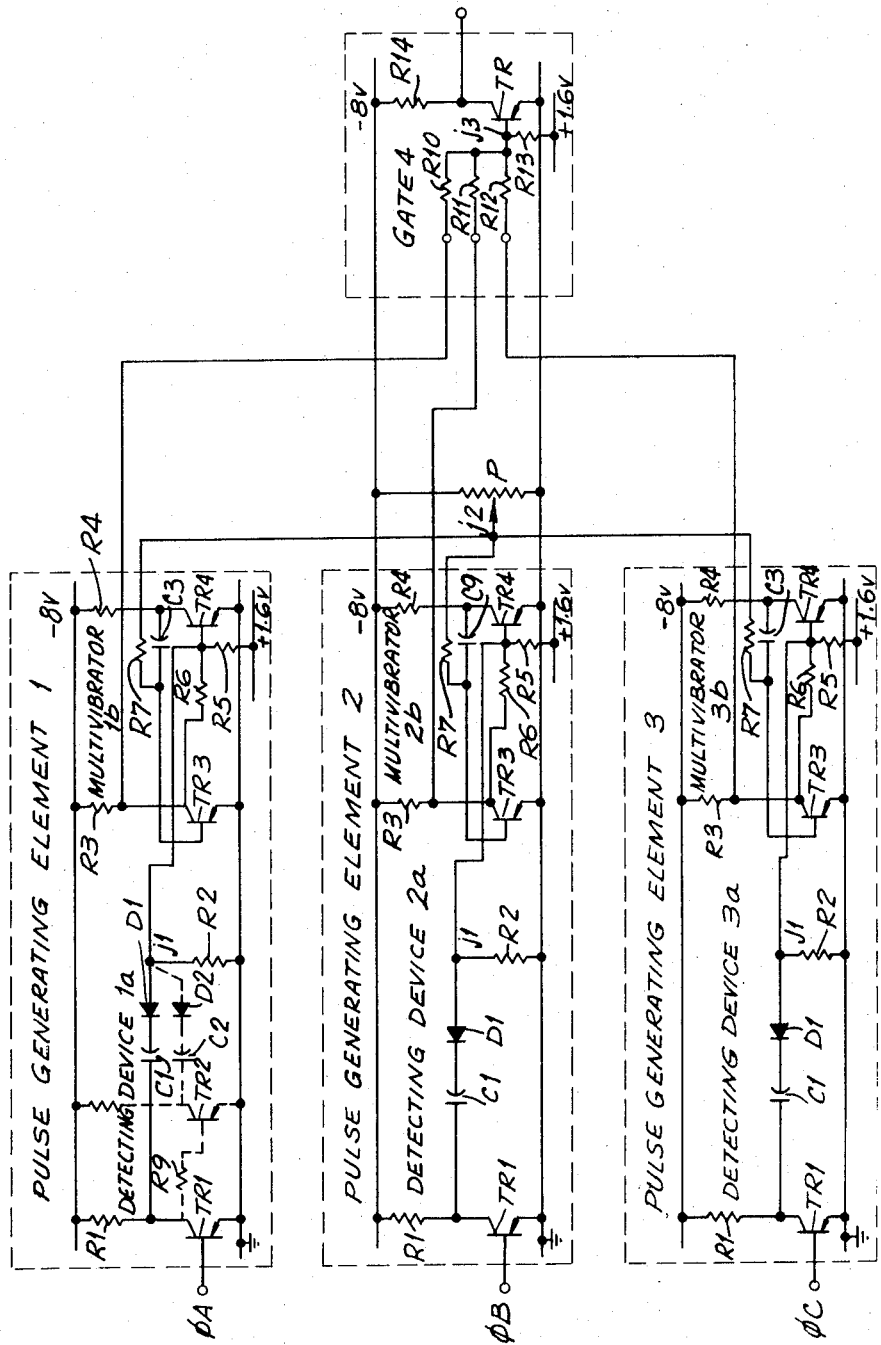
FIG. 5 is a schematic circuit diagram of a filter of the invention.

All described modes of operation and several variations can be achieved in a balance pulse filter having the circuit shown in FIG. 5.

In FIG. 5, each detecting device comprises one transistor TR1, when the single frequency mode of operation is to be used, and an additional transistor TR2, the leads to which are drawn with dotted line in the detecting device 1a, when the double frequency mode of operation is to be used. The illustrated embodiment utilizes PNP-transistors but NPN transistors could equally well be used with a reversal of polarity. The emitters of the transistors TR1 and TR2 are grounded and the collectors are connected in series by load resistors R1 and R8 respectively to the negative side of a direct current source.

Referring to the pulse generating element 1, the signal $\Phi A$ of the phase A is applied to the base of transistor TR1. The base of transistor TR2, if it is used, is connected in series with the resistor R9 to the collector of the transistor TR1. The collector of the transistor TR1 is connected in series by capacitor C1 and diode D1 to one terminal of the resistor R2 the other terminal of which is grounded. If transistor TR2 is also used, its collector is connected in series by capacitor C2 and diode D2 to the same terminal of the resistor R2 forming a junction $j1$.

The monostable multivibrators 1b, 2b and 3b are known forms of monostable multivibrators. Each comprises a pair of transistors TR3, TR4 having collector load resistors R3 and R4, both emitters being grounded. The cross coupling from the collector of the transistor TR3 to the base of transistor TR4 is by resistor R6 and the cross coupling from the collector of transistor TR4 to the base of transistor TR3 is by capacitor C3. The base of transistor TR3 is connected in series with resistor R7 to junction point $j2$ and the base of transistor TR4 is connected in series with resistor R5 to a positive potential.

The gate is a known Kirchhoff's circuit. It comprises one transistor TR, the emitter being grounded and the collector having load resistor R14. The base of transistor TR is connected to junction point $j3$ to which three resistors R10, R11 and R12 are connected to one terminal, the others being the three input terminals of the gate. Moreover, the base is connected in series with resistor R13 to a positive potential. The input terminals of the gate are connected to the collectors of transistors TR3 in multivibrators 1b, 2b and 3b.

The operation of the circuit is as follows. The signals ΦA, ΦB and ΦC applied to the bases of transistors TR1 in detecting devices 1a, 2a and 3a respectively. The transistor TR1 is switched on when input wave is negative and is switched off when input wave is positive, thereby providing for transformation of sine-waves into rectangular waves. The rectangular wave appearing at the collector of transistor TR1 is in turn differentiated by C1, R2 resulting in the appearing of negative triggering pulses at instants when the potential of the collector changes to negative. The transistor TR2, if it is used, reverses the phase of the rectangular wave. The reversed rectangular wave is differentiated by C2, R2 resulting in the appearing of negative triggering pulses occurring when ΦA changes in sign to negative. The triggering pulses appearing at junction point j1 are applied to the bases of transistors TR4 in multivibrators 1b, 2b and 3b. Each multivibrator has one stable state with transistor TR3 conducting. The negative triggering pulse causes the base of TR4 to be forward biased. Consequently TR3 is turned off for the time interval determined by the time constant of C3 and R7 and the potential of the junction point j2. By changing resistor R7 or capacitor C3, the time duration of generated pulses can be regulated independently for each multivibrator, whereas by changing the potential of junction point j2 the duration of pulses generated by all three multivibrators can be simultaneously regulated. The output from each multivibrator is taken from the collector of TR3 and applied to one of the input terminals of the gate. The output of the gate is taken from the collector of the transistor TR. Resistor R13 connects the base of TR with a positive potential providing preliminary backward biasing.

The mode of single-frequency operation is achieved by using only one transistor in each of the three detecting devices resulting in the producing of only one triggering pulse per cycle, and regulating the duration of pulses generated by monostable multivibrators to be equal to one-third $f$, when continuous monitoring is required or introducing some definite difference relative to this pulse duration, when a threshold operation is required.

The mode of double-frequency operation is achieved by using in each detecting device two transistors TR1 and TR2 resulting in the producing of two triggering pulses per cycle, and regulating the duration of pulses generated by monostable multivibrators to be equal to one-sixth $f$, when continuous monitoring is required or introducing some definite difference relative to this basic pulse duration, when a threshold operation is required.

The two variations of logic operation can be achieved in the gate circuit in FIG. 5, as follows: The pulses applied to the input terminals are negative pulses. The positive potential of the base of transistor TR is decreasing in a degree dependent upon how many pulses occur simultaneously at input terminals of the gate. The value of resistor R13 can be chosen so that one input signal at a time does not cause forward biasing of transistor TR but two negative pulses at any two inputs cause TR to be forward biased. If the value of resistor R13 has been chosen in this way, the gate performs the logic operation of the formula $a \cdot b + b \cdot c + c \cdot a$ providing an output signal of positive pulses when coincidences of any two phases occur. The second alternative can be achieved when the value of resistor R13 has been chosen in such a way that negative pulse at only one input causes forward biasing of TR, but when there is no input signal then TR is turned off. In this case, the gate performs the logic operation of the formula $\bar{a} \cdot \bar{b} \cdot \bar{c}$, providing an output signal of negative pulses when gaps between pulses of different phases occur.

What is claimed is:

1. A balance pulse filter for a three-phase input signal comprising three detecting means for generating triggering pulses at discrete values of said input signals, three monostable means adapted for being set by said triggering pulses, and gate means responsive to the cycling of said monostable circuits and providing an output signal only when said three-phase signals are unbalanced, said detecting means and monostable means constituting three pulse generating elements, each being responsive to a number of discrete values of input signals appearing at time intervals equal to the period of the input signals divided by the number of said discrete values and producing rectangular pulses which are started at instants when said discrete values occur and have a basic pulse duration equal to one-third of the time interval between subsequent discrete values, said gate means having an output when coincidences between pulses of any two phases occur and providing output pulses of the same polarity and the same amplitude, the duration of which is proportional to phase angle errors of one sign of three-phase input signals.

2. A balance pulse filter for a three-phase input signal comprising three detecting means for generating triggering pulses as discrete values of said input signals, three monostable means adapted for being set by said triggering pulses, and gate means responsive to the cycling of said monostable circuits and providing an output signal only when said three-phase signals are unbalanced, said detecting means and monostable means constituting three pulse generating elements, each being responsive to a number of discrete values of input signals appearing at time intervals equal to the period of the input signal divided by the number of said discrete values and producing rectangular pulses which are started at instants when said discrete values occur and have a duration shorter than the basic pulse duration equal to one-third of the time interval between subsequent discrete values, said gate means having an output when coincidences between pulses of any two phases occur and providing output pulses when the difference between actual pulse duration and said basic pulse duration has been compensated by phase angle errors of one sign occuring in the three-phase input signal.

3. A balance pulse filter for a three-phase input signal comprising three detecting means for generating triggering pulses at discrete values of said input signals, three monostable means adapted for being set by said triggering pulses, and gate means responsive to the cycling of said monostable circuits and providing an output signal only when said three-phase signals are unbalanced, said detecting means and monostable means constituting three pulse generating elements, each being responsive to a number of discrete values of input signals appearing at time intervals equal to the period of the input signals divided by the number of said discrete values and producing rectangular pulses which are started at instants when said discrete values occur and have a basic pulse duration equal to one-third of the time interval between subsequent discrete values, said gate means having an output when gaps between pulses of all three phases occur and providing output pulses of the same polarity and the same amplitude, the duration of which is proportional to phase angle errors of one sign of the three-phase input signals.

4. A balance pulse filter for a three-phase input signal comprising three detecting means for generating triggering pulses at discrete values of said input signals, three monostable means adapted for being set by said triggering pulses, and gate means responsive to the cycling of said monostable circuits and providing an output signal only when said three-phase signals are unbalanced, said detecting means and monostable means constituting three pulse generating elements, each being responsive to a number of discrete values of input signals appearing at time intervals equal to the period of the input signals divided by the number of said discrete values and producing rectangular pulses which are started at instants when said discrete values occur and have a duration greater than the basic pulse duration equal to one-third of the time interval between subsequent discrete values, said gate means having an output when gaps between phases of all three phases occur and providing output pulses when the difference between actual pulse duration and said basic pulse duration has been compensated by phase angle errors of one sign occurring to the three-phase input signals.

* * * * *